United States Patent [19]

Miller

[11] 4,321,464
[45] Mar. 23, 1982

[54] DEVICE FOR MEASURING VIBRATION PHASE AND AMPLITUDE

[75] Inventor: Robert C. Miller, Penn Hills, Pa.

[73] Assignee: Westinghouse Electric Corp., Pittsburgh, Pa.

[21] Appl. No.: 114,921

[22] Filed: Jan. 24, 1980

Related U.S. Application Data

[63] Continuation-in-part of Ser. No. 913,774, Jun. 8, 1978, Pat. No. 4,218,614.

[51] Int. Cl.³ .............................................. G01D 5/34
[52] U.S. Cl. ................................. 250/231 R; 73/655
[58] Field of Search ............... 250/231 R, 227, 237 G; 73/651, 653–657

[56] References Cited

U.S. PATENT DOCUMENTS

| | | | |
|---|---|---|---|
| 2,214,910 | 9/1940 | Potts | 250/231 R |
| 2,351,955 | 6/1944 | Graf | 250/231 R |
| 2,666,650 | 1/1954 | MacDonell | 250/231 R |
| 2,873,103 | 2/1959 | Hautly | 73/653 |
| 3,093,743 | 6/1963 | Inderwiesen | 250/232 |
| 3,364,813 | 1/1968 | McKinney | 73/655 |
| 3,709,030 | 1/1973 | Aselman | 73/71.1 |
| 3,742,486 | 6/1973 | Skidmore | 250/227 |
| 3,886,562 | 5/1975 | Atzinger et al. | 250/231 R |
| 3,975,633 | 8/1976 | Larkin | 250/231 R |
| 4,218,614 | 8/1980 | Miller | 250/231 R |

*Primary Examiner*—David C. Nelms
*Attorney, Agent, or Firm*—William D. Lanyi

[57] ABSTRACT

A device for measuring vibration is herein disclosed and claimed, said device comprising: a vane attached to a vibratory member; a light supply and at least one detector; and light guides. The vane includes or is attached to a mask having therein a plurality of light directing and light opaque elements. During vibration the mask travels transversely of the light path. The elements of the mask may be encoded, as with a Gray Code, so as to yield both amplitude and phase information. Or the elements may be so arranged as to chop the light into a plurality of pulses for each vibration of the vane through the use of a second, stationary mask. In either case the device yields information whose interpretation is substantially independent of fluctuations in the intensity of the source light.

24 Claims, 14 Drawing Figures

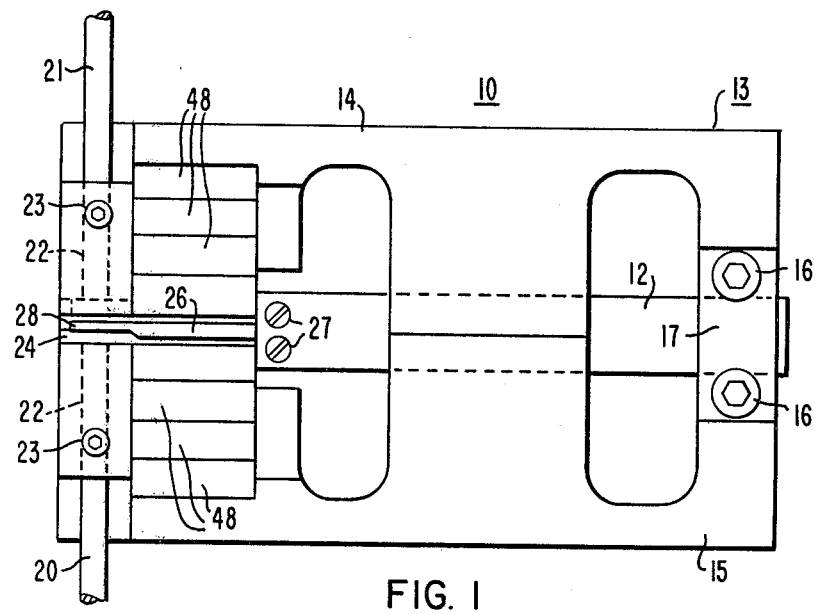
FIG. 1
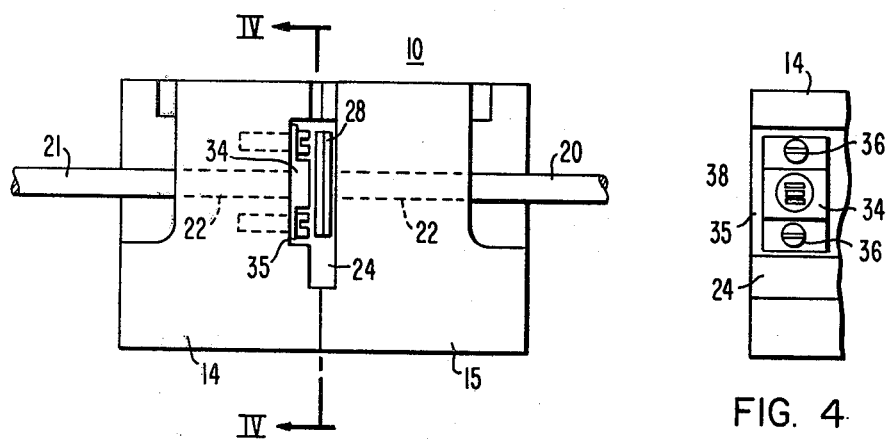
FIG. 2
FIG. 4

DEVICE FOR MEASURING VIBRATION PHASE AND AMPLITUDE

CROSS-REFERENCE TO RELATED APPLICATION

This application is a continuation-in-part of the commonly assigned, copending application, Ser. No. 913,774 which was filed on June 8, 1978 by R. C. Miller, now U.S. Pat. No. 4,218,614.

BACKGROUND OF THE INVENTION

The present invention relates to a device for measuring vibration which is particularly useful for monitoring the operation of electrical equipment, although its usefulness is obviously not limited to this particular application.

In many instances, it is desirable to measure vibration, and transmit that measurement to a remote location. In electrical equipment such as large generators, for example, it is desirable to monitor the machine to detect the occurrence of abnormal vibration in the stator windings, the stator core, or other parts of the machine. Fiber optics provide a very desirable means for transmitting this information since a light guide consist of glass fibers, which are insulating and not affected by high voltages, magnetic fields, high temperature, or other environmental influences to which they may be subjected. Various devices have been employed for the measurement of vibration, incorporating light guides to transmit light between a light source and a receiver, crossing the path of a vibratory vane. Frequently the intensity of light transmitted by the receiving light guide is determined, and, by converting it to an electrical signal, it can be conveniently used to indicate the amplitude of movement of the vane. Such a system, however, has serious limitations. For example, such a system can only be employed to measure amplitudes which are comparable to the diameter of the light guide. A more serious deficiency of such a system is that any change in intensity of the light source from which the light signal is obtained, or in the sensitivity of the electrical detection means, or in the optical transmission characteristics of the light guides, results in a change in the amount of observed light and thus causes an erroneous measurement.

SUMMARY OF THE INVENTION

In accordance with the present invention, a vibration measuring device is herein provided which utilizes fiber optics to obtain a digital output signal from which a measurement of the vibration can be determined; said measurement being independent of variations in the light intensity, transmissivity of the light guides, and other such variables.

In a first embodiment a vibration measuring device is described which can monitor the amplitude of vibration, for example, of high voltage conductors in electrical equipment. For this purpose, a vibratory reed is provided which is excited into vibration by a vibratory member to be monitored. The reed includes or is attached to a vane portion; said vane portion being located at the free end of the reed. Two fiber optic light guides are provided, one of which serves as a light source and the other as a receiver. The two light guides are positioned with the vane extending across the light path between the source and the receiver. Two masks are provided. The vane carries or includes a mask having alternating light directing elements and opaque elements.

For example, in a light transmissive version of the device, the light guides are positioned on opposite sides of the vane in opposed orientation, so that light is transmitted from the light source through the mask on the vane to the light receiver. In this version, the directing elements of the mask may be slits in the mask, and the opaque elements may be the spaces between the slits.

In a light reflective version, the light guides are positioned on the same side of the vane and the light directing elements are reflective surfaces, while the light opaque elements are non-reflective.

An important feature of this embodiment is a stationary mask which is positioned across the light path between a light guide and the vane. The stationary mask has at least one light transmissive element corresponding in size and orientation to the light directing elements in the movable mask. Vibration of the reed, causes the movable mask to move transversely of the light path in such a manner that the light transmissive elements in the moving mask coincide alternately with light transmissive elements in the stationary mask. A series of light pulses is thus transmitted to the receiver, the light varying from a maximum to a minimum. The receiver light guide directs the light to a desired remote location, and is there provided with any suitable means, preferably an electrical detecting system, for counting the number of light transmission pulses in a given time. This embodiment yields a measurement of the amplitude of the vibration, which can be readily determined from the known dimensions and spacing of the slits in the mask. Thus, it provides a digital output whose interpretation is independent of fluctuations in the intensity of light received.

In another embodiment, a vibration measuring device is described which is capable of providing vibration amplitude and phase information over a relatively wide range of frequencies. In this embodiment a case is rigidly attached to the vibrating member to be measured. Contained within the case is a movable mass connected to the case by two flat springs. The mass and the springs are chosen so that their resonant frequency is small relative to the frequency of vibration to be measured. For example, the resonant frequency of the mass and springs as a system is 10 to 20 Hertz when the frequency to be measured is 60 to 180 Hertz. This is the frequency range typically of interest when monitoring electrical equipment, such as a generator. Attached to the mass is a mask having tracks which are preferably encoded in a Gray code format. As with the embodiment described above, the mask has light directing and light opaque elements. The light directing elements can be either slits or reflective surfaces as is the case in the above embodiment. The light-directing elements form a pattern which, in combination with source light guides and receiver guides, generates a light signal which indicates the vertical position of the mask relative to the guides. The receiver light guides are connectable to light detectors, whose output can be converted from the particular Gray code to an analog signal and displayed in real time, or the output can be sampled and stored in a shift register. This stored data can later be decoded for study. Thus, this embodiment again provides a vibration measuring device which is independent of fluctuations in the intensity of the light.

BRIEF DESCRIPTION OF THE DRAWINGS

The invention will be more fully understood from the following detailed description, taken in connection with the accompanying drawings, in which:

FIG. 1 is a top view of a vibration measuring device employing the invention;

FIG. 2 is an end view of the device of FIG. 1;

FIG. 4 is a fragmentary view on the line IV—IV of FIG. 2;

DESCRIPTION OF THE PREFERRED EMBODIMENT

Figure 3:
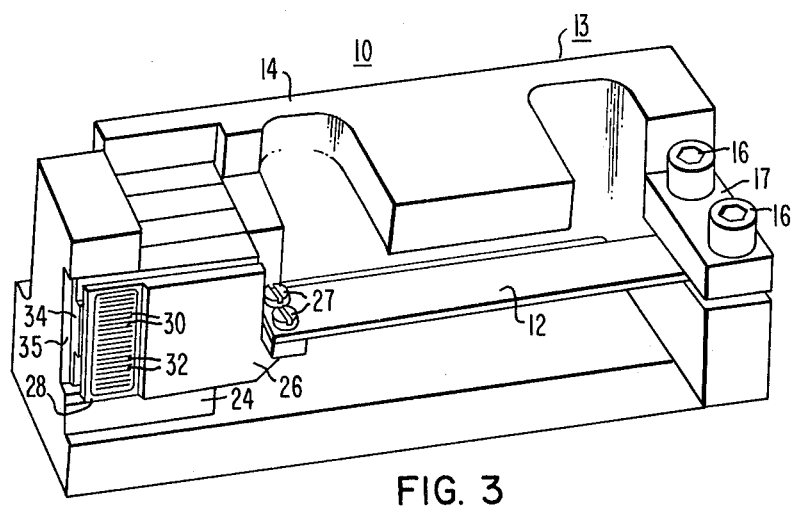
FIG. 3 is a side view of the interior of the device of FIG. 1, one of the side members and the light guides being omitted.

In the drawings, like features bear like reference numerals.

FIGS. 1 through 4 show an illustrative embodiment of a vibration measuring device 10. The device 10 includes a vibratory reed 12, enclosed in a container or case 13 consisting of two side members 14 and 15, which together form a generally rectangular box or enclosure. The side members 14 and 15 may be made of aluminum or other suitable material and may be held together by means of screws or in any other desired manner. The reed 12 is preferably made of phosphor bronze, although it could be made of any suitable material. One end of the reed is clamped in the container, for example, by means of screws 16 and a clamping member 17. In operation, device 10 is attached to a member which is to be monitored, so as to be subjected to any vibration that may occur. The reed 12 will be excited into vibration through the container, thereby causing its free end to be subject to responsive vibration. The amplitude of the responsive vibration of the reed will be determined by the resonant and mechanical characteristics of the reed itself; and its frequency determined by the frequency of the applied vibration.

In order to measure the vibration, and to transmit the information obtained to a remote location, fiber optics can be utilized. In a transmissive version of the device, a light guide 20 is provided to serve as a light source for the device 10, and a similar light guide 21 serves as the receiver. The light guides 20 and 21 are fiber optic members of the well-known type, consisting of one or more glass fibers of suitable size adapted to transmit light with negligible loss. The light guides 20 and 21 are received in openings 22 in the side members 14 and 15, respectively, and held in place by set screws 23. The end portions of the members 14 and 15 are recessed at the end opposite the clamping member 17 to form a narrow slot 24 between them. The openings 22 extend through the ends of the respective members 14 and 15 to the slot 24, and the light guides 20 and 21 are thus held in alignment with their ends spaced apart at least by the width of the slot 24.

Figure 7A:
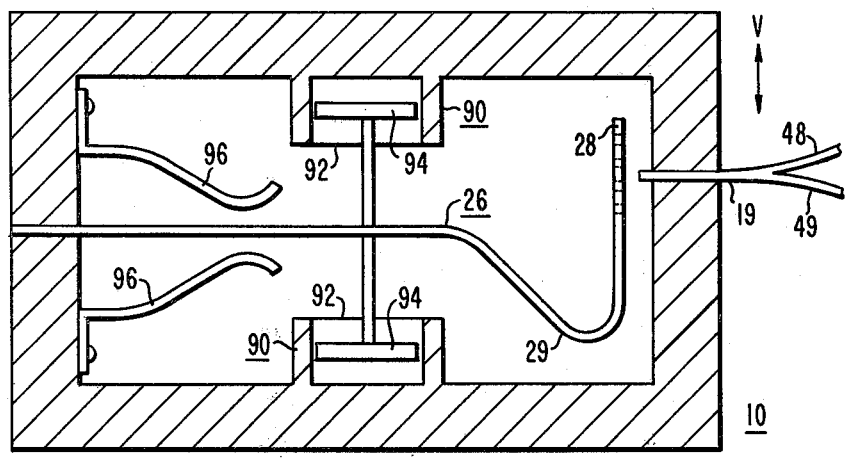
FIG. 7A is a side view of a vibration measuring device, similar to that shown in FIG. 1, in which a single light guide serves as both the light source and receiver.
Figure 7B:
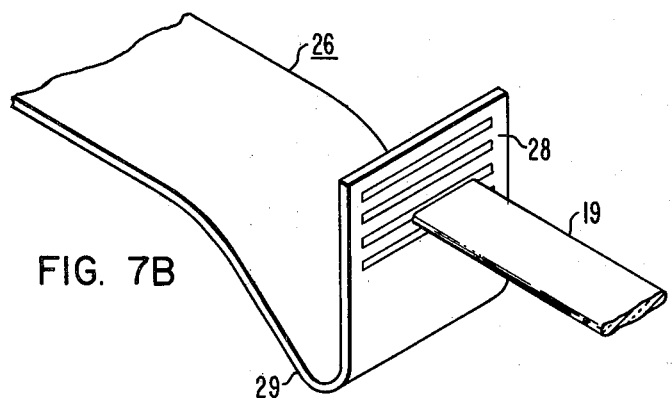
FIG. 7B is a perspective drawing of the vane of FIG. 7A.
Figure 12:
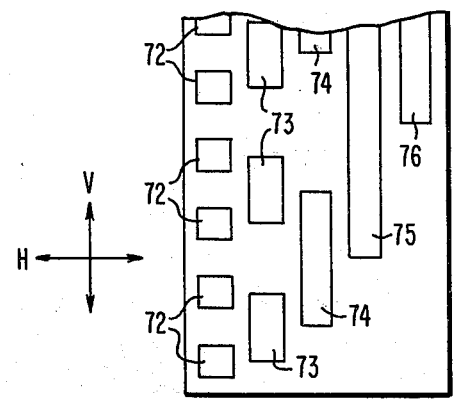
FIG. 12 is an enlarged view of the mask in FIG. 11.
Figure 8:
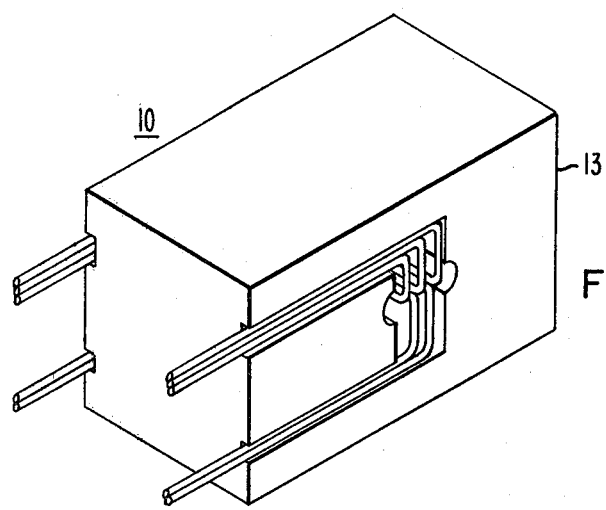
FIG. 8 is a perspective view of a vibration measuring device capable of providing vibration phase information.
Figure 10:
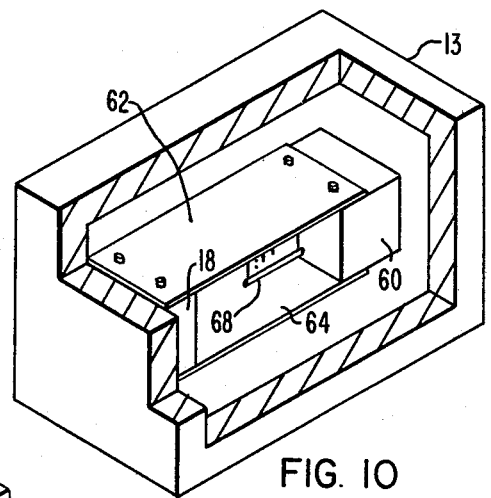
FIG. 10 is a partial perspective view of the device of FIG. 8 with the light guides and part of the case omitted.
Figure 9:
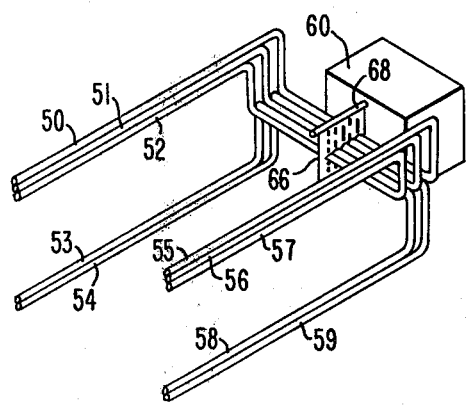
FIG. 9 is an illustration of the device of FIG. 8, with the outer case omitted.
Figure 11:
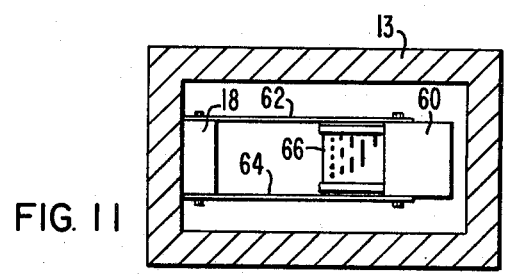
FIG. 11 is a side view of the device of FIG. 10.

A vane 26 is attached to the end of the vibrating reed 12 by screws 27, or other suitable means (or the vane may be a portion of the reed itself as is illustrated in FIGS. 7A, 7B). The vane 26 extends into the slot 24 across the light path between the light guides 20 and 21. The vane 26 may be made of aluminum, or other suitable material, and extends generally transversely to the vibrating reed 12 so that, as the reed 12 vibrates, the vane 26 moves vertically (along the axis designated "V" in the drawings) up and down in the slot 24. The vane 26 carries a mask portion 28, which in the preferred embodiment shown in the drawings, is integral with the vane itself. The mask portion 28 can be seen in FIG. 3 and has a plurality of alternating light directing elements and opaque elements which extend transversely of the direction of movement of the reed 12.

Despite the use of the term "vertical" as a convenient designation of an axis of motion, the device 10 can be attached to the vibratory member in any desired orientation. Of course, the device 10 will only measure the component of vibration along the axis designated "V" in the drawings.

In a preferred version of this embodiment, the light transmitting elements of the mask portion 28 are formed by a plurality of elongated slits 30 which are transverse to the direction of movement of the vane and extend across the light path between the light guides 20 and 21. The opaque elements 32 consist of the solid portions of the vane 26 between the slits 30. The widths of the slits 30 and of the opaque portions 32 are made substantially equal, so that the slits are uniformly spaced apart vertically, and a substantial number of slits is provided extending from top to bottom of the vane.

In an alternative version of the device 10, the source and receiver light guides are located on the same side of the reed 10, as is illustrated in FIG. 7. In fact, a single light guide or bundle can serve as both source and receiver. Thus, it is not necessary for light guides to be in opposing positions on opposite sides of the vane 26. In this version, the light guide 19 is placed on one side of the vane 26; and the mask portion 28 is provided with light directing elements which are reflective, and light opaque elements which are non-reflective. In this version, the light opaque elements can, for example, be a plurality of slits through the vane.

In either version, a stationary mask 34 (stationary relative to the vibratory member) extends across the end of receiver light guide. The mask 34 is placed in a recess 35 at one side of the slit 24 and secured in place by screws 36. As shown in FIG. 4, the stationary mask 34 may have three slits 38 separated by opaque portions of the mask. The slits 38 are of the same dimensions and spacing as the slits 30 and are similarly oriented. Three slits 38 are used in the stationary mask 34 in an illustrative embodiment but it will be understood that any number of slits, either more or less, could be utilized depending on the size of the slits and the diameter of the light guide. As shown, the stationary mask 34 is positioned over the receiving light guide 31 as shown in FIG. 2 in such a position that the slits extend across the end of the light guide so that the light must pass through the slits to reach the light guide. The mask 34 is positioned so that the slits 38 are in substantial alignment with the light-directing elements in the mask portion 28, and substantially parallel to them.

It will be seen, for example, that if the reed 12 is stationary with the slits in the masks 28 and 34 coinciding in position, light transmitted through the light guide 20 will pass through both masks to the receiving light guide 21. If the reed 12 is excited into vibration, however, the mask portion 28 moves vertically with the reed, and the light directing elements in the mask 34 are substantially aligned alternately with the slits 30 and the opaque portions 32 of the mask 28. The amount of light reaching the guide 21, therefore, will vary between a maximum and a minimum as the slits move into and out of alignment. The number of light pulses thus occurring during one excursion at the end of the reed is a measure of the amplitude of that excursion.

In the reflective embodiment, the light from the light guide 19 is reflected back to the same light guide 19 (as explained below in reference to FIGS. 7A, 7B) after passing through the stationary mask 34. This causes a plurality of light pulses for each vibration of the vane 26. A count of the pulses yields the amplitude of the vibration of the reed 12 relative to the vibratory member. This is related to the amplitude of vibration of the vibratory member by the mechanical gain (empirically determined) of the reed 12. The amplitude of the vibration of the vibratory member is equal to the vibrational amplitude of the reed 12 divided by its mechanical gain.

Figure 5:
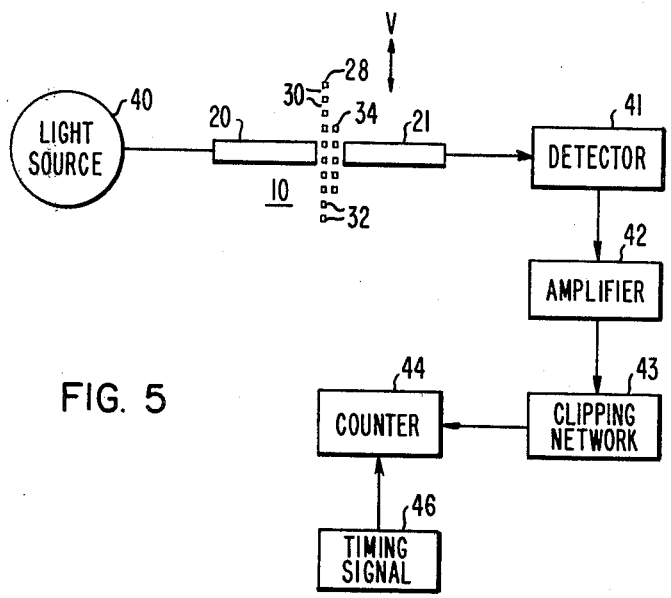
FIG. 5 is a schematic diagram illustrating the complete system incorporating the device of FIG. 1.

A complete system incorporating the transmissive embodiment, for example, is shown diagrammatically in FIG. 5. As there shown, a light source 40 of any suitable type is provided at a remote location, and light from the source is transmitted to the device 10 through the light guide 20. The light guides 20 and 21 are placed in opposed positions, as described below, with their ends in alignment and spaced apart. The moving and stationary masks 28 and 34 extend across the space between the two light guides, so that the light from the source light guide passes through the slits in the masks to the receiving light guide 21 for transmission to a remote location.

The width of the slits in the masks is made relatively small, compared to the expected amplitude of vibration of the reed 12. As the reed vibrates and the slits 30 and 38 move into and out of coincidence, the light is transmitted through the masks from the light source 30 to the light receiver 21 in a series of pulses, varying from maximum to minimum light intensity. The light is therefore modulated by the masks. A substantial number of such pulses occur during each excursion of the reed. The number of light pulses is directly related to the amplitude of the excursion, and the amplitude of vibration can therefore be determined by counting the number of occurrences of pulsed transmission of light through the masks from the light source 20 to the receiver 21 in a time corresponding to the period of vibration.

This counting may be done in any suitable manner, preferably at a remote location, and FIG. 5 shows a simple system for doing this electrically. The light pulses received through the light guide 21 are applied to detector 41, such as a PIN diode, which converts the light pulses to corresponding electrical signals which are amplified in an amplifier 42 and fed to a clipping network 43. The output of the network 43 is a square wave of constant amplitude consisting of pulses corresponding to the light pulses transmitted to the light guide 21. This wave is applied to a counter 44 which counts the number of pulses, preferably by counting the zero crossing of the square wave. A timing signal 46 is also preferably supplied to the counter 44 to gate it ON for a preset period of time, so that the counter will register the number of light pulses in a preset time interval.

In most applications of the device 10, the frequency of the vibration to be measured will be known, either exactly or to a close approximation. Thus, if the device 10 is used for monitoring the vibration of the core or conductors of a large generator or transformer, for example, the frequency of the vibration will be twice the line frequency, or very close to 120 Hertz in the United States, and a timing signal can be set accordingly. In this case, the number of light pulses is counted during an interval of 1/120 of a second, which is the period of one complete cycle of vibration, and is directly related to the amplitude of vibration. Since the spacing and width of the slits in the two masks is known, the amplitude can be determined.

Figure 6:
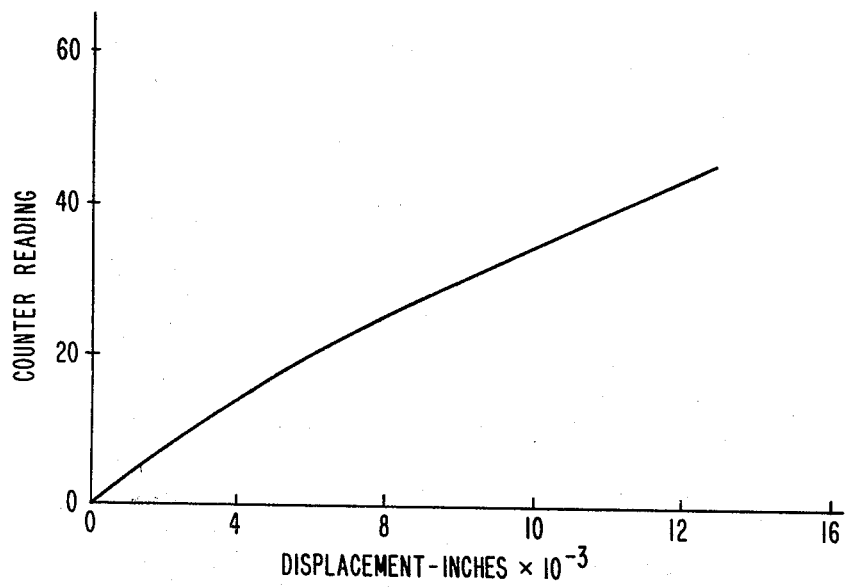
FIG. 6 is a typical calibration curve for the system of FIG. 5.

A typical calibration curve of the device 10 is shown by way of example in FIG. 6. As there shown, the reading of the counter 44 is plotted against the corresponding displacement of the vane 26 in thousandths of an inch. The vibration of this curve from a straight line is attributable to a slight change in the mechanical amplification characteristics of the reed as a function of amplitude. It will be seen that with such calibration curve, the reading of the counter 44 can be interpreted directly to show the amplitude of vibration of the reed and thus indicate the magnitude of vibration, or change in vibration, of the member on which the device 10 is mounted.

It is not actually necessary to know the frequency of vibration since the frequency can be determined from the output of the clipping network 43 as a function of time. That is, the time interval between pulses varies during one period of the vibration so that the time of a half period, or the frequency, can easily be determined. It is thus easily possible to monitor at a remote location the vibration occurring in the large generator, for example, or in any other machine in which vibration is of interest. The device is particularly useful for electrical equipment since the device 10 itself can be made of either metallic or non-metallic materials, and the light guides 20 and 21 consist of glass fibers which are inherently insulating and which are not affected by electrical fields, magnetic fields, or other adverse environmental influences.

The sensitivity of the device is affected by the resonance characteristics of the reed 12 which is influenced by the material used. The material can be a phosphor bronze or a non-conducting material such as fused silica or alumina, as desired. The sensitivity depends on the mechanical characteristics of the material, and the dimensions of the reed itself, and is related to the spacing of the slits in the masks which may be made quite small. For example, the device 10 has been tested with the spacing in the order of 6 mils between the slits.

If the sensitivity is greater than is required for particular application, additional damping can be provided by permanent magnets 48 disposed in a device 10 on each side of the vane 26, if the vane is made of conducting material such as aluminum. The magnets 48 cause currents to be induced in the vane which react with a magnetic field to provide the desired damping forces. Damping can also be provided in other ways if desired. Thus, if the presence of a magnetic field in the device is undesirable, or if the vane cannot be made of conducting material for any reason, viscous damping can be provided by filling the container formed by the members 14 or 15 with a suitable liquid. As another alternative, the reed can be tuned to a natural resonant frequency which is sufficiently different from the applied frequency to reduce the amplitude of vibration to the extent desired.

FIG. 7A is a side view of a vibration measuring device similar to that shown in FIG. 1 but with the following differences: Firstly, a single light guide 19 serves as both the light source and receiver. This is achieved by employing a reflective version of the mask 28. On the mask 28 are alternating reflecting and non-reflecting strips. The light guide 19 includes a plurality of filaments. Of these, for example, a plurality of filaments 48 may conduct light to the device 10 from a light supply (not shown) while another plurality of filaments 49 conduct light reflected from the device 10 to a light detector (not shown). The filaments 48, 49 are dispersed within light guide 19 in a substantially uniform fashion. The light guide 19, for example, has a cross-section substantially equal in size and configuration to that of the light-directing elements of the movable mask. In this case, a stationary mask is not necessary. However, if the light guide 19 has a larger dimension in the vertical direction than the elements of the movable mask 28, then a stationary mask 34 is required, as is described above. Note that the stationary mask 34 can likewise be omitted in the other embodiments and versions herein described, so long as this limitation on the receiving light guide is observed.

A second difference is in the shape of the reed 12 and the orientation of the light guide 19. Note that the vane 26 is a one piece construction and has a bend region 29. This permits the reed 12 to be substantially parallel to the associated light guide 19. This is in contradiction to the transverse orientation in FIG. 1. It should be understood that the reflective version discussed herein can utilize either orientation, or any other desired one. The bend region 29 is enlarged and shown in perspective in FIG. 7B. It should be understood that different bend geometries are embraced by this invention.

A third noteworthy feature illustrated in FIG. 7A is the damping and limiting means. In the figure, a top and bottom dampening means 90 comprises a cylinder 92 containing a loosely fitting piston 94 which is connected to the reed 12. This is one arrangement for an air dampener though other geometries can be employed. Also shown are a plurality of limiters, each limiter 96 is for example, a curved leaf spring, which provides additional damping at high amplitudes. This can also be achieved by the piston and cylinder dampener 90 through utilizing a variable diameter cylinder. For example the cylinder can have a tapered or step geometry with its smaller effective diameter at its end farthest from the vane. Either or both dampener 90 and limiter 96 can be incorporated in device 10 as shown on FIG. 1 or 7A.

ALTERNATIVE EMBODIMENTS

Another embodiment of the vibration measuring device has been designed using light guides to transmit light and information to and from the vibration measuring device, which is capable of operating over a range of frequencies and providing amplitude and phase information at a slight sacrifice in sensitivity to low amplitude vibrations.

The structure and operation of this embodiment can be understood by referring to FIGS. 8 through 13. The device 10 in this embodiment consists of a case 13, for example, made of an insulating material such as a glass-epoxy composition. In operation, the case 13 is attached to a vibratory member whose vibrations are to be measured. Contained within the case 13 is a movable mask 60 which is connected to the case 13 via a spring means such as two flat leaf springs 62 and 64. The mass 60 and the springs 62, 64 are chosen so that the resonant frequency of this system is approximately, for example, 10 to 20 Hertz. This is an appropriate frequency range for the device 10 when the device 10 is used to measure vibration in certain electrical equipment. As can be seen from the drawings, the geometry of this system is in general that of a parallelogram formed by the springs 62, 64, the mass 60 and a spacer 18 included in the case 13. This geometry allows movement relative to the case, of the mass 60 in a vertical direction, and resists twisting and motions at right angles to the vertical direction. It should be understood that any geometry which achieves this preferred motion is within the purview of this invention. A mask 66 is rigidly attached to the mass 60 by any means such as, for example, pins 68. The mask 66 includes columns of light-directing elements (such as holes or reflecting surfaces) designated 72, 73, 74, 75, and 76. The columns 72–76 are arranged in a pattern, which, in combination with an input light guide (having a cross-sectional width equal to that of the mask in the "H" direction) or a plurality of input light guides 50 through 54; and a plurality of output light guides designated 55 through 59 delineates a light path. Each of these light guides is, for example, comprised of a single filament. The output light guide associated with each vertical column must be appropriately sized so as to be substantially unresponsive to light transmitted by the light-directing elements in other columns; and be substantially responsive to light transmitted through only one light-directing element in a single column. Furthermore, each output light guide's dimension in the vertical direction should be, for example, less than one-half the size in that direction of the light-directing elements 72. As the mask 66 moves vertically in response to the vibration, a light signal is generated which indicates the vertical position of the mask 66 relative to the receiver light guides 55–59.

In detail, the light guides and mask 66 are arranged for example so that light from guide 50 would pass directly to guide 55 in the absence of mask 66. When the mask 66 is present the light strikes the mask 66 somewhere along a line formed by the centers of the column 72. Guides 53 and 58 are located on the line through the center of column 75 and guides 54 and 59 are located on the line through the center of column 76.

Since, in the unit shown, there are five pairs of light guides, and the light is either transmitted or not transmitted through each pair of light guides, there are therefore, 32 unique combinations. Thus the vertical location along the mask 66 of the light guides, can be determined to be one of those 32 positions. The arrangement of the directing elements shown in the drawings is known as a Gray code. Gray codes have the property that, in going from one entry to the next, only one element of the code changes. Thus, the greatest error that can arise, when the mask is located halfway between two of the possible 32 positions in the above example, is only one element. It should be understood that, in operation, for a single vibration of the vibratory member, a plurality of pulses of light are produced.

It should be further understood that the choice of the number of light guide pairs, and the number of elements in the mask forming the Gray code was given for illustrative purposes. The numbers may vary with the application without departing from the spirit of the invention.

Figure 13:
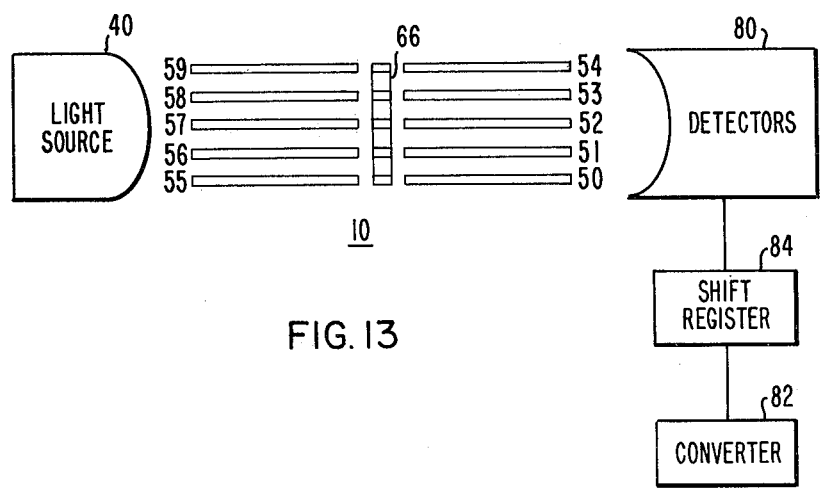
FIG. 13 is a schematic diagram illustrating the complete system incorporating the device of FIG. 8.

In operation, light is directed into the input guides 50 through 54. The light is directed from them onto the mask 66. The output guides 55 through 59, positioned to receive the light, direct the light to a detection means, for example, a plurality of suitable light detectors 80 such as photodiodes or phototransistors. The output from these detectors 80 can be fed into a converting means 82 to convert from the particular Gray code used to an electrical output. The output from the converting means 82 can be displayed in analog form in real time. As an alternative, the Gray coded output from the detectors 80 can be sampled at regular time intervals and stored in a shift register 84. The data stored in the shift register 84 can be decoded, and thereby converted to an analog and studied at any future time. This mode of operation would be useful in studying transients, and is illustrated in FIG. 13.

Since the resonant frequency of the system is low compared to the frequencies of interest, and the monitoring of electrical equipment usually involves frequencies of 60, 120, and 180 Hertz, the mass 60 essentially remains stationary while the case moves in response to the vibrating member to which it is connected. The light guides are secured in their position by being attached to the case. As a consequence of this, unlike the previous embodiment detailed above, the light guides are in effect subjected to responsive vibration while the mask within the case 13 is relatively stationary. The identification of the detector under illumination at a particular instance of time yields the position of the vibratory member at that time. This combination of features permits the measurement of the position of the mask relative to the case, and thus measures the motion of the conductor.

As with the previous embodiment, the light transmitting elements may be the holes discussed above or they may be reflective elements. In the latter case, the light guides are positioned in one side of the mask 66 in a manner similar to that discussed in reference to FIGS. 7A and 7B.

While this invention has been shown and described in connection with a preferred embodiment thereof, this invention is not limited thereto and includes all modifications and alterations as fall within the true spirit and scope of the invention. For example, rather than utilizing a mask having slits or reflecting elements the mask can have elements painted or in any way coated with fluorescent material. In this case, a detector is employed which is responsive to the frequency range of the emitted light from the particular material utilized. This could thereby increase the ratio of the amplitude of the maxima to minima light received by the detector.

What we claim is:

1. A device for measuring vibration of a vibratory member, said device comprising: a reed attached to said vibratory member for movement therewith; a light source; a light receiver, said light source and light receiver being positioned for transmission of light from the source to the receiver; said reed including a mask portion extending across the light path between the source and the receiver, said mask portion having a plurality of light-directing elements extending transversely of the light path; a stationary mask extending across the light path, and having at least one light transmitting element; a predetermined mass attached to said reed; and light receiving means including means for counting the number of pulses of light, transmitted to the light receiving means, for each vibration of said vibratory member.

2. The device of claim 1 in which said light source and said light receiver are positioned on the same side of said reed.

3. The device of claim 1 or 2 in which said mask portion's light directing elements are reflective, and are separated, one from another, by substantially non-reflective elements.

4. The device of claim 1, wherein:
said light directing elements of said mask form a code pattern.

5. The device of claim 1, wherein:
said predetermined mass substantially reduces the resonant frequency of said reed.

6. A device for measuring the amplitude and phase of vibration of a vibratory member, said device comprising: a spring attached to said vibratory member at one of its ends; a predetermined mass attached to the free end of said spring; a mask attached to said mass, said mask having thereon light directing elements and opaque elements, said elements forming a Gray code; at least one input light guide for directing light to the mask; a plurality of light detectors; and a plurality of output light guides for receiving light from the mask and directing the light to the light detector; whereby said mask is substantially stationary while said light guides move in response to the vibration of said vibratory member; and whereby the identification of the detectors under illumination at a particular instance of time yields the position of the vibratory member at that time.

7. The device of claim 6 in which said input and output light guides are positioned on the same side of said mask.

8. The device of claim 6 or 7 in which said mask portion's light directing elements are reflective, and are separated, one from another, by substantialy non-reflective elements.

9. The device of claim 6 in which the light detectors convert the light signals into electrical signals; and said device further including means for converting the electrical signal from the Gray code to an analog signal.

10. The device of claim 6 wherein said input light guide is in opposed orientation relative to said output light guides, with said mask therebetween; and wherein said mask's light directing elements comprise slits through the mask.

11. The device of claim 6 in which the spring includes a plurality of leaves generally parallel to one another and in spaced apart relation, one end of each leaf secured to said mass.

12. A vibration measuring system comprising:
(a) a vibratory reed, said reed responsive to the vibration to be measured, said reed having a free end and a fixed end; said reed including a mask having alternating light-directing and light opaque elements;

(b) a source light guide to transmit light to said reed;

(c) a receiver light guide disposed to transmit light from said reed;

(d) means for selectively receiving light from said reed, said means positioned between said reed and said receiver light guide;

(e) means for detecting the pulses of light transmitted by the receiver light guide; whereby each vibration of said reed causes the mask to move across a light path in such manner as to modulate the light, said modulation being detected, and being related to the vibration to be measured;

(f) a predetermined mass attached to said vibratory reed, said mass substantially reducing the resonant frequency of said reed and mass assembly; and (g) means for counting said pulses of light transmitted by said receive light guide.

13. The system of claim 12 further including means for limiting the amplitude of vibration of the reed.

14. The system of claim 6 or 12 wherein the light directing elements of the mask are fluorescent, and the detector means selectively responds to the frequency of the emitted light.

15. The system of claim 12 wherein the source light guide and the receiver light guide are located on one side of said mask, and said light-directing elements are reflective.

16. The system of claim 12 wherein said means for selectively receiving light includes a mask having at least one light-directing element substantially equal in size to the light-directing elements in the reed's mask.

17. The system of claim 12 wherein said means for selectively receiving light is a portion of said receiver light guide having a cross-sectional dimension equal to that of the light-directing elements' widths in the vertical direction.

18. The system of claim 12 wherein said light-directing elements form a pattern which, when illuminated, yields information as to the phase of vibration of the reed.

19. The system of claim 18 wherein the light-directing elements of the mask form a Gray code pattern.

20. The system of claim 19 wherein the light-directing elements form a plurality of columns; the receiver light guide includes a plurality of filaments; and said detector means includes a plurality of detectors, at least one per column, each detector optically linked to its associated column via at least one of said receiver light guide filaments.

21. The system of claim 20 further comprising means for converting the output of the detectors into an analog signal.

22. The system of claim 20 wherein said reed comprises a plurality of leaf springs, and further including a mass attached to said free end of the reed, whereby said mass establishes a predetermined resonant frequency for vibration of the reed.

23. The system of claim 12 further including means for dampening the vibration of the reed.

24. The system of claim 23 wherein the dampening means includes a cylinder; and a piston within said cylinder.

* * * * *